United States Patent
Graf von Deym et al.

(10) Patent No.: US 6,845,869 B1
(45) Date of Patent: Jan. 25, 2005

(54) SORTING AND SEPARATING METHOD AND SYSTEM FOR RECYCLING PLASTICS

(76) Inventors: Carl-Ludwig Graf von Deym, Auf der Platte 30, 63667 Nidda 1 (DE); Fritz Michael Streuber, Bakusbrink 27, 32120 Hildenhausen (DE)

( * ) Notice: Subject to any disclaimer, the term of this patent is extended or adjusted under 35 U.S.C. 154(b) by 0 days.

(21) Appl. No.: 10/009,313

(22) PCT Filed: May 5, 2000

(86) PCT No.: PCT/EP00/04097

§ 371 (c)(1),
(2), (4) Date: Apr. 19, 2002

(87) PCT Pub. No.: WO00/67977

PCT Pub. Date: Nov. 16, 2000

(30) Foreign Application Priority Data

May 6, 1999 (EP) ............................................ 99108578

(51) Int. Cl.[7] .......................... B07C 5/00; B07C 5/342; B07C 5/334
(52) U.S. Cl. ...................... 209/522; 209/524; 209/571; 209/576; 209/580; 209/581
(58) Field of Search ................................. 209/930, 522, 209/524, 571, 576, 577, 580, 581, 582

(56) References Cited

U.S. PATENT DOCUMENTS

| | | |
|---|---|---|
| 5,150,307 A | 9/1992 | McCourt et al. |
| 5,303,826 A | 4/1994 | Buzga |
| 5,443,164 A * | 8/1995 | Walsh et al. ................. 209/580 |
| 5,448,074 A * | 9/1995 | Seagro, Jr. ................. 250/461.1 |
| 5,502,559 A * | 3/1996 | Powell et al. ................. 356/73 |
| 5,555,984 A * | 9/1996 | Sommer et al. ............ 209/580 |
| 5,603,413 A * | 2/1997 | Mitchum, Jr. ............... 209/580 |
| 5,804,035 A | 9/1998 | Michanickl et al. |
| 6,234,317 B1 * | 5/2001 | Sommer ......................... 209/3 |
| 6,497,324 B1 * | 12/2002 | Doak et al. .................. 209/522 |
| 6,610,981 B2 * | 8/2003 | Sommer, Jr. ............ 250/339.06 |

FOREIGN PATENT DOCUMENTS

| | | |
|---|---|---|
| DE | 2455987 | 8/1976 |
| DE | 4004300 | 8/1991 |
| DE | 19509152 | 10/1995 |
| DE | 19538235 | 4/1997 |
| DE | 19651571 | 6/1998 |
| EP | 389734 | 10/1990 |
| EP | 634260 | 1/1995 |
| WO | WO 98/31519 | 7/1998 |

OTHER PUBLICATIONS

German Language Search Report dated Oct. 11, 1999, Application No. EP–99108578.
International Search Report dated Sep. 27, 2000, Application No. PCT/EP00/04097.

* cited by examiner

Primary Examiner—Donald P. Walsh
Assistant Examiner—Jonathan R Miller
(74) Attorney, Agent, or Firm—RatnerPrestia (57) ABSTRACT

In a sorting and separating method for recycling plastics provided in a mixture of plastics as refuse, said mixture of plastics is sorted and separated according to colours. Fractions of plastics thus obtained, separated according to colours, are sorted and separated according to types of plastic.

21 Claims, 9 Drawing Sheets

"Grüne Punkt" SYSTEM in Austria and Germany

Fig. 8 plastic regranulate (with only a 95% degree of purity)
chopped composite material (firing material for the cement industry)

Advantages:

- valuable substance are reclaimed.
- no waste incineration /
  no valuable substances destroyed
- little exhaust gas, no filter dust.
- no primary energy destroyed
  by firing.

Disadvantages:

- large hauling distances
- cannot reclaim the aluminium in composite material. cannot recycle composite material.
- the plastic regranulate has a degree of purity of only 95%.
- the compost is highly subsidised, as there is no market for it.

WASTE INCINERATION in Europe  Fig. 9

Advantages:

- there is no costly pre-sorting.
- the waste incineration plant can process any waste that turns up.

Disadvantages:

- ash is created which has to be specially disposed of, because it contains loaded residues such as aluminium oxide.
- filter dust is created which turns up in the flue gas washing facility and has to be specially disposed of because it contains poisons, e.g. furances, dioxines, or their combustion residues.
- transporting the waste to the incineration plant requires wide roads leading up to it, because of the enormous capacity of at least 200,000 tonnes per year. this creates considerable transport costs.
- considerable quantities of primary energy, such as gas or heating oil, have to be fired in order to incinerate e.g. biological waste (cut grass, etc.)
- the large amount of HGV traffic is an annoyance to nearby residents.
- valuable substances are destroyed.
- 3 tonnes of burning material creates 1 tonne of slag to be disposed of, i.e. the recycling rate is only 66%.

SORTING AND SEPARATING METHOD AND SYSTEM FOR RECYCLING PLASTICS

The invention relates to a sorting and separating method for recycling plastics, and a plant for recycling plastics and preferably also for recycling other materials.

Refuse material consisting of household waste, industrial waste and/or waste coming directly from economic circulation or already stored at refuse disposal sites, is subject to a recycling process, though in an unsatisfactory manner. This is especially the case with plastic refuse. Regranulated plastic refuse of one type, after passing through current recycling methods, exhibits a degree of purity of at best 95% and a greyish colour. A recycling product comparable to a product as new cannot be manufactured from such material.

Figure 8:
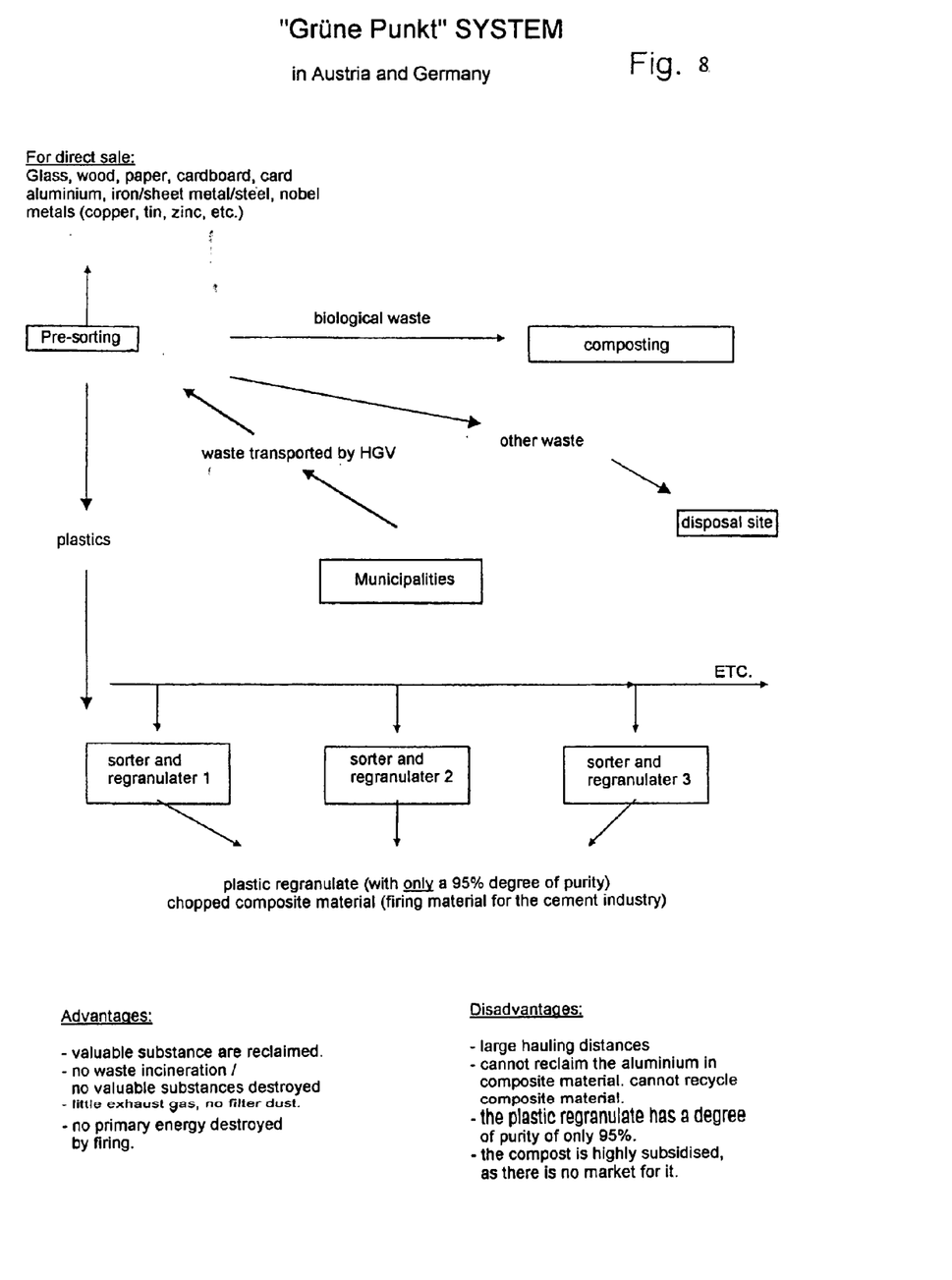
FIG. 8 recycling in accordance with the prior art.
Figure 9:
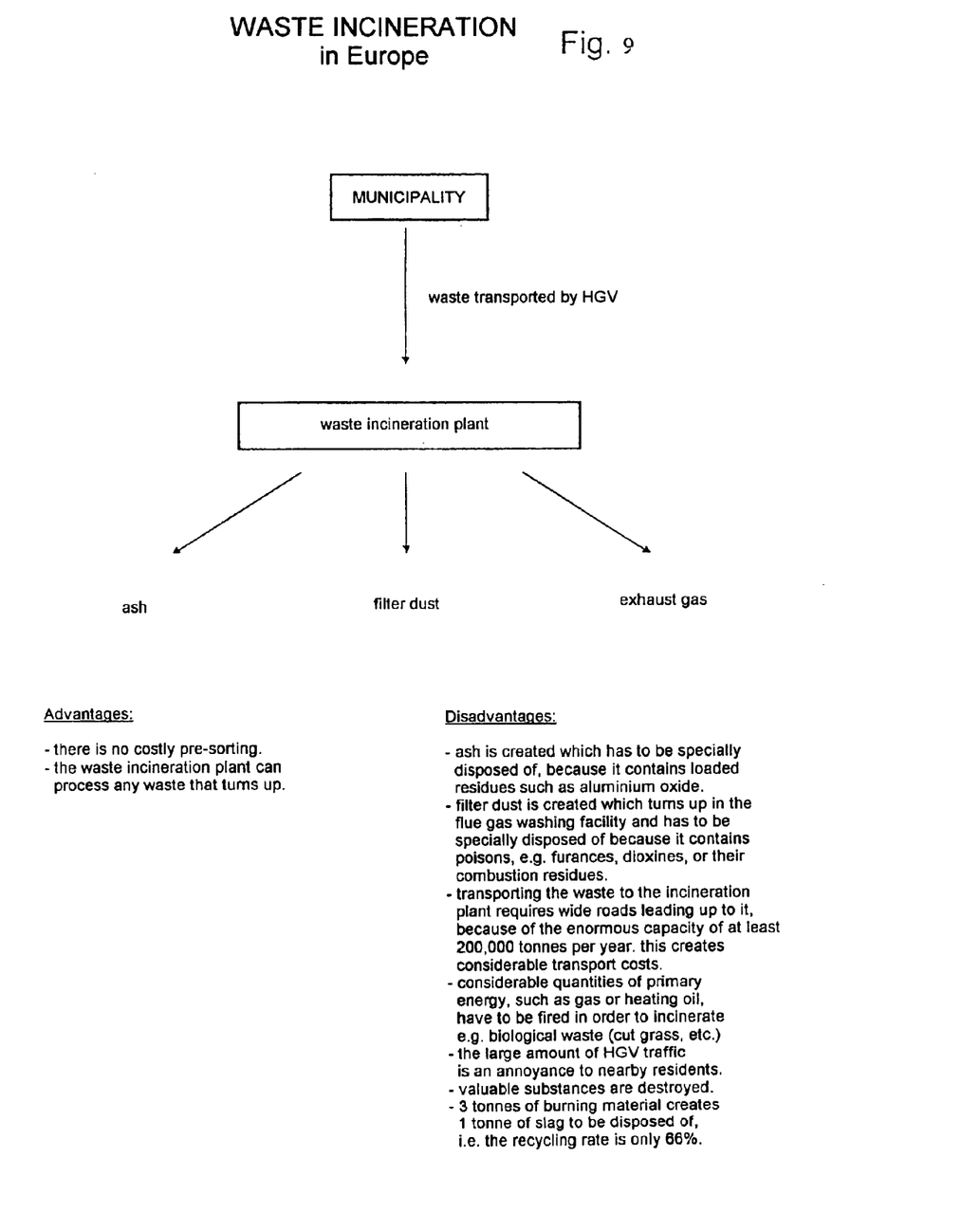
FIG. 9 recycling in accordance with the prior art.

Examples of waste management systems are shown in FIGS. 8 and 9, with their advantages and disadvantages.

Current waste management and recycling systems involve a further problem, namely that due to the various pre-sorting of refuse material, a multitude of containers have to be used in final consumer households and/or in industrial factories, for the different waste fractions. High waste management costs arising from this are further increased by the fact that fractions of plastics pre-sorted in this way cannot be extensively compressed in waste vehicles, since otherwise they cannot be sorted further. Material identifications are often no longer recognisable.

Moreover, there often exists no pre-sorting at the place where the refuse arises, even in industrialised states. In many countries, pre-sorting cannot be carried out from the start.

It is an object of the invention to improve the quality of recycled plastics.

This object is solved by the subjects of the independent claims.

The invention has as its starting point a sorting and separating method for recycling plastics, i.e. plastic refuse, in a mixture of plastics. The mixture of plastics can, for example, be a fraction of plastics already pre-sorted in households. By way of pre-sorting and separating, the mixture of plastics can however also be obtained from a mixture of material containing the plastics mixed in with non-plastics. In a preferred embodiment, the invention relates to a sorting and separating method for recycling mixed refuse, and then also preferably includes pre-sorting and pre-separating plastics, if the plastics to be recycled are given over to the method in a mixture of material, for example as disposal site diggings or as mixed household and/or industrial waste. The mixture of material is formed in particular by household waste, for example the "Grüne Punkt" fraction, bulky waste, industrial waste, the disposal site fraction or any combination of these fractions.

A plant for recycling plastics, and preferably also for recycling other materials, contained in such a mixture of material preferably includes one first type-separating means which separates plastics and non-plastics. It includes at least a second type-separating means which separates the plastics which have separated from the non-plastics according to type of plastic.

In accordance with the invention, the mixture of plastics is not only sorted and separated according to types, but also according to colours. Sorting and separating according to colours is carried out before sorting and separating according to types of plastic. The material is preferably colour-sorted according to primary colours. The primary colours for colour-sorting are preferably formed by standardised colours, in particular the colours green, yellow, red, black, white, blue and transparent. The primary colours are preferably RAL primary colours. The material can be colour-sorted and colour-separated by hand or automatically.

An advantage of the invention is that waste no longer needs to be separated in private households. However, as far as household waste is concerned, this is preferably still sorted and separated in households, even when using the method and/or a plant in accordance with the invention, but then preferably into just two waste containers, namely one for biological refuse and one for all other fractions of household waste. Such a separation, however, is undertaken primarily for purely hygienic reasons and not due to any demand substantiated by the invention.

In order to facilitate, or even enable in the first place, automatic colour-sorting and -separating, it is advantageous if the plastics supplied, for example in the form of moulded parts and sheeting, each comprise a coding which may be exactly assigned to a primary colour, preferably in the form of a compounded-in material which may be detected by a laser. The laser-detectable material can be compounded in in the refinery. It is however preferably compounded into the so-called master batches at the first processor. Compounding in only after the refinery, preferably into the master batch at the first processor, enables the laser-detectable primary colour identification medium to be extracted. Compounding in would in principle admittedly be simpler to manage and secure in the refinery, but involves the disadvantage that as a result of possible erroneous colour-sorting, mixing would gradually take place during recycling and downcycling would then be marked out. Plastics coded in this way, in particular plastics coded in master batches, are also a subject of the invention and only in the present application are not separately claimed as such.

A plant for recycling plastics in accordance with the invention comprises a means for colour-sorting and separating which is arranged in the plant, with respect to the flow of material, between the first type-separating means cited, if this is present, and the second type-separating means. Sorting and separating according to colour will be described in the following in a shortened form as colour separating.

By the method and plant in accordance with the invention, plastics which up until now have only been obtained in a grey hue in recycling are economically obtained both pure in type and pure in colour. Through melting and then compounding, and preferably regranulating, the plastic recycling material, pure in type and colour, obtained using the method in accordance with the invention can be processed into a starting material for plastic moulded bodies, plastic sheeting or the like which also satisfies high demands with respect to colour. In particular, plastic recycling material obtained by means of the method in accordance with the invention can also be re-used for visible surfaces and not only, for example, as filler.

The fractions of plastics formed in this way, pure in primary colour, are preferably subjected to extraction, fraction by fraction, in an extractor directly after sorting and separating according to the primary colours established in the foregoing. A carrousel extractor is preferably used as the extractor. Ethyl acetate is particularly preferable in accordance with the invention as the extraction medium. A standard carrousel extractor is preferably used in combination with hot ethyl acetate as the extraction medium.

Before extraction, the extraction medium is preferably heated to a temperature between 30° C. and the ebullition temperature of the extraction medium. It is particularly preferably pre-heated to a temperature in the range 30 to 60° C. The temperature of the extraction medium at least corresponds to that of the material to be purified. By heating the extraction medium, condensation of the same on the material to be purified is avoided. The extraction medium is preferably applied to the fraction of plastics at a temperature higher than that of the fraction of plastics. The plastic material is expediently taken into the extraction means at room temperature. The extraction medium is preferably sprayed, drizzled or trickled, onto the plastic material, i.e. applied in sparing doses. By preferably not forming a full extraction bath, the extraction medium is on the one hand used sparingly, and on the other the danger of explosion arising from the preferred use of ethyl acetate as the extraction medium is completely removed, or at least reduced to the extent that the extraction means need not be designed explosion-proof.

The extraction means in the form of a preferred carrousel extractor is formed by chambers in a drum, said chambers being rotated about a common axis during extraction, wherein the chambers are arranged in sequence in the direction of rotation. In the course of one revolution, the chambers pass through a plurality of stations, in particular a filling station for the fraction of plastics, a station for applying the extraction medium, a station for removing the extraction medium, a station for introducing hot steam and a station for unloading. The danger of explosion is further counteracted by this segmenting.

Once the material has been sorted and separated according to colour, and before extraction, the fractions of colour are expediently comminuted, for example shredded by means of a cutting tool. The plastic particles for the extractor obtained in this way exhibit a diameter of preferably 20 mm at most.

The method procedure in accordance with the invention of placing colour separating before separating according to type has the advantage that plastics coloured according to primary colours, in particular RAL primary colours, in refineries are retained in their primary colour. The invention is based on the recognition that colour monomers are embedded in the polymer chains of the plastics, to colour them in the primary colours. The colour monomers cannot be removed from the plastic matrix without destroying the polymer chains. This recognition is used to firstly form fractions of colours from the mixture of plastics and only then to separate these fractions of colours according to types. The fractions may be separated according to types of plastic by means of proven methods, preferably in a mechanical/physical separating means. Toned colours are sorted under the nearest primary colour, for example light green under the primary colour green and purple under the primary colour red. The colour monomers embedded in the polymer chains as of the refinery cannot be dissolved out of the polymer chains by means of the extraction performed after colour separation in accordance with the invention, without damaging or even destroying the polymer chains. Colour toning smaller quantities of plastics—smaller as compared to the quantities of primary colour plastics—is, however, achieved by imprinting or lacquering part or all of the surface of the plastics, or by adding colour compounds, for example titanium oxide, as an additive in an extrusion process.

Through an extraction performed after colour separation but before separation according to type of plastic, preferably using ethyl acetate as the extraction medium, all impurities and adhesions are extracted, except for the colour monomers embedded in the polymer chains of the plastics to colour them in the primary colours. The impurities and adhesions may on the one hand be additives or printing inks worked in or applied by the manufacturer, or also substances which have only become deposited in the plastic product through use.

Extraction may also take place before colour separating. This has the advantage that the plastics are already in their primary colours before colour separation. In particular, this favours automating colour separation. When, for example, the preferred carrousel extractor is used and extraction is performed beforehand, colour separation by hand is, however, generally no longer possible, since the plastic material for such an extraction means is supplied in the form of small plastic particles.

Sorting and separating according to types of plastic, after colour separating and preferably extraction, preferably includes thermal separating, wherein differences in the melting points of plastics and/or types of plastics to be thermally separated are utilised. Thermal separating preferably takes place in a chamber or tunnel charged with a hot gas. The atmosphere in the tunnel can, however, also be heated to and maintained at the required temperature by means of a heating device in the tunnel, for example radiant heaters. In a first embodiment of a thermal separating means, the plastics to be thermally separated are transported further in the tunnel lying on a perforated support. The perforated support is preferably developed as a continuously circulating, perforated conveyor belt. In principle, the perforated support can also be formed by perforated plates which are moved on individually by means of a conveyor belt or in batches as inherent conveyor carriages. A cooling means, in particular a cooling bath, is preferably arranged underneath the perforated support, wherein a plastic material melted in the tunnel drips down from the perforated support into said cooling means, and re-solidifies in it. Another conveying means, in particular a conveying belt, is advantageously arranged inside a cooling bath, the re-solidified plastic material being transported by said conveying means to a drying means to be dried. The thermal scanner in accordance with the invention particularly preferably works according to the principle of a hot air shrinkage tunnel. The term 'perforated support' is meant to include not only punched supports but also grid and mesh supports and the like, as long as the double function of supporting on the one hand and flowing through on the other is fulfilled.

In an alternative embodiment, separating by type in the thermal scanner does not take place by way of sieve separating, but rather optically. In this case, the particles of the fractions of plastics to be separated are likewise heated, such that the particles of the lowest melting type are at least melted on the surface, while the particles of the other type of plastic or of the plurality of other types of plastic are less extensively or preferably not at all melted. The plastic particles are then optically identified by way of the composition of their surface, or their form if an identifiable change in form has taken place in the lowest melting plastic material, and are separated from each other according to the identification results using suitable means. They are preferably separated using pressurised gas.

The plant preferably comprises a bio gas generator topped by one or more small gas turbines. Methane gas is generated by means of micro-organisms in the bio gas generator from organic material removed in the plant from the starting mixture of material and/or from the mixture of plastics obtained from it. The methane gas generated is combusted in the at least one gas in turbine. The combustion gas thus arising is used to generate processing energy for the plant. In particular, the processing energy generated in this way by the plant itself can be used for preparing or generating steam for the extractor or the thermal scanner, if such plant components are present, or for both plant components.

The plant also advantageously comprises a chip and fibre recycling means by which chips and fibres are obtained from wood refuse separated out from the mixture of material in the plant, in particular pressboard material and old furniture, in a multi-stage chemico-thermo-mechanical method. The chemico-thermo-mechanical unit of the chip and fibre recycling means is preferably topped by a press which presses the mixture of slurry and residual chips and fibres leaving the chemico-thermo-mechanical unit into pressed pieces. These pressed pieces, preferably pressed in the shape of briquettes, can then be put into handy carriers, for example at 10 kilograms each, to be fired as substitute fuel for coal briquettes. Instead of pressed pieces, fertiliser can also be produced from this mixture.

Before colour separating and after a first type-separation, preferably carried out, according to plastics and non-plastics, the mixture of plastics is preferably subjected to an analysis for material degradation. Based on the results of the analysis, plastics which fall short of a predetermined degree of degradation are further treated separately from plastics which do not fall short of this predetermined degree of degradation. Thus, in other words, there is a quality control and separation of plastics of differing qualities. Although there is preferably quality separation into just two qualities, separation into more than two qualities is also conceivable. The quality control serves to separate plastics with destroyed molecular structures from plastics with a molecular structure which is sufficient intact for further processing and which is therefore worthwhile.

The length of the molecular chains of the plastics serves as a measure of the degree of degradation. Material degradation can be caused in particular due to the effect of sunlight while the plastics are stored in the mixture of plastics or in a mixture of material from which the mixture of plastics is formed. The effect of the sunlight causes UV-related degradation by disintegrating the chains of molecules of the plastics. Such disintegration beyond the predetermined admissible degree of degradation can occur after just a few weeks of storage in the open. The predetermined degree of degradation in the sense of the invention corresponds to a state of the plastics in which the lengths of the chains of molecules of the plastics on average fall short of a minimum length which may vary from one type of plastic to another. The degradation of plastics is affected by exposure to UV light and by the degree of recycling. Decisive in this respect is that certain plastics, such as are for example used in the food industry, are not equipped with UV-stabilisers. These plastics disintegrate after just six weeks' storage in the open air. On the other hand, regranulating in the course of recycling one and the same material reduces the molecular chain by one member, such that after ten or twelve recycling processes a mechanically solid granulate can no longer be produced from said material.

A preferred method of analysis is to test the tensile strength of a plastic to be analysed. The degradation is ascertained by means of a tension test in accordance with the prior art. The tensile strength is used as a measure of the degradation. The material is preferably tested by means of random samples. The mixture of plastics to be tested is preferably tested in batches. When testing in batches in a random sample method, the whole batch from which the test sample(s) has/have been taken is further treated uniformly depending on the test results. Testing in batches using random samples is sufficiently meaningful if the plastics in the mixture of plastics have a uniform past history with respect to material degradation. This is usually the case, since the material degradation in the plastics may primarily be traced back to the effect of sunlight. Degradation is thus substantially determined by the storage conditions and period of storage of the mixture of plastics or the starting mixture of material at the site of the plant in accordance with the invention. These external circumstances vary substantially only from batch to batch and not within an individual batch.

Plastics which are degraded beyond the predetermined degree of degradation in the aforementioned sense are preferably not sorted and separated according to colours, but rather comminuted. The plastic particles resulting from this preferably exhibit a particle size in the range 5 to 20 mm, particularly preferably 5 to 10 mm.

A preferred application of said removed plastic granulate is combusting it in incineration plants for the purposes of obtaining energy, preferably in power stations and waste incineration plants, or as a raw material for obtaining gas by means of pyrolysis. In particular, these can replace primary fossil energy carriers or, in the example of waste incineration plants, increase the calorific value of the material to be incinerated. Through comminution into particles, the granulate obtained in this way may be conveyed through nozzles of the incineration plants, in particular coal dust firing plants, without any significant modifications, and combusted as a substitute for fossil energy carriers. Expensive modifications to existing incineration plants are not required. The comminution and use of the plastic granulate obtained in this way in accordance with the invention can also be advantageously performed for any mixture of plastics of the type described above. In this way, an analysis of the material is in principle not necessarily required, although preferred. The mixture of plastics supplied can also simply be comminuted, despite the degree of degradation of the plastics contained in it, and prepared for use as fuel in an incineration plant.

Advantageously, the material can also be tested as described above without the subsequent sorting and separating according to colour, to form at least two flows of plastic material which are further treated in different ways. Preferably, the flow of material, of said two, comprising the lower quality plastic material is then arranged and used as described above, and the other flow of material comprising the higher quality plastic material is further treated in other recycling.

Accordingly, the subject of the invention includes a sorting and separating method for recycling plastics which are provided in a mixture of plastics as refuse, wherein the mixture of plastics is subjected to an analysis for material degradation, and depending on the results of the analysis at least two flows of material are formed. One of the flows of material contains lower quality plastics, in particular having destroyed molecular structures. This flow of material is preferably subjected to comminution. The plastic particles obtained in this way are preferably intended for use as fuel. The at least one other flow of material contains those plastics of such a quality that recycling by means of a suitable recycling method, particularly preferably that of the invention, is worthwhile.

Also a subject of the invention is comminuting plastics which are provided in a mixture of plastics as refuse, and using the plastic particles arising in this way as fuel for an incineration plant or as a raw material for obtaining gas in a pyrolysis plant. The refuse plastics are preferably prepared and used in accordance with the invention after they have been previously analysed as described above and after at least two flows of material have been formed, though this is not restricted to this. Most particularly preferably, the refuse plastics are prepared and used within the framework of the sorting and separating method in accordance with the invention, to further increase economic efficiency through optimal availability of plastics.

The plant in accordance with the invention is advantageously built in modules, such that it may be simply and optimally adapted to the ground available for its assembly and to the recycling object to be solved. The plant may include one, a combination, or all of the plant components described above.

In accordance with a further aspect of the invention, the fraction of plastics can be separated according to primary colours after it has been separated according to types. It is in this case preferably separated according to types after having undergone extraction, again preferably by means of an extraction means of the type described. Extraction can instead, however, take place after separation according to type and before separation according to colour.

Although extraction can also in principle not be carried out until after colour separation in the case of fully automatic colour separation, extraction is in this case preferably carried out before colour separation. Fully automatic colour separation is thus preferably carried out after separation according to type and after extraction, if the fractions of plastics, pure in type but still mixed with regard to primary colours, are nonetheless free of interfering hues, contaminants and the like. The automatic colour separation is preferably carried out by optically identifying each individual plastic particle and treating the plastic particles with a directed, pulsed, gaseous medium, preferably pressurised air, wherein a pulse strength of the pressurised medium is selected depending on the colour of each plastic particle.

The analysis of the plastics, the extractor, the thermal scanner, the bio gas generator topped by the gas turbine and the chip and fibre recycling means may also be used without sorting and separating according to colours in accordance with the invention. For example, an available recycling plant for disposal site diggings or another mixture of material of the type described at the beginning can be equipped with one or with a combination of these plant components. In principle, the means can also be used in combination with conventional separation according to types of plastic, to improve the plastic recycling product. It is particularly advantageous if components already developed for other purposes and available on the market, such as the preferred carrousel extractor or a hot air shrinkage tunnel, are used for the extractor, the thermal scanner and/or the chip and fibre recycling means, a further particularity in accordance with the invention being that an otherwise conventional carrousel extractor is driven by hot ethyl acetate instead of hot water and/or that a palette known from conventional hot air shrinkage tunnels is replaced by a driven conveying means comprising a perforated support.

A fully integrated recycling plant and a modified recycling plant comprising all the components described above will now be described by way of the figures. The features disclosed in the example embodiments develop the invention further, each individually and in any combination. There is shown:

Using the plants, all materials from the international green refuse list of the Basle Agreement can be sorted, unsorted or processed into any fraction mix. A large part of this material is recycled by means of the recycling steps in accordance with the invention and their adaptation in accordance with the invention, and in plant components used in accordance with the invention. The plants can accept and process household waste, industrial waste and disposal site diggings individually or mixed. In particular, the plants can process and to a large extent recycle biological waste such as cut grass, organic household refuse and liquid fertiliser, electric and electronic scrap, plastic refuse from households and/or industry, complete, non-disassembled heave goods vehicles and/or motorcars, bulky waste, other waste from households, composites, for example plastic—plastic composites, paper-plastic composites, plastic-metal composites and the like.

In a first step in the recycling method, the mixture of refuse material to be recycled is subjected to pre-sorting and separating in a pre-sorting and separating means 1. The pre-sorting and separating means 1 includes an FE-collector to collect magnetic material, an NE-collector to separate noble and non-noble metals and a cross-flow sifter. As a result, the mixture is presorted into plastics and non-plastics. The magnetic material, steel, glass and wood are immediately removed, as long as they are in the purest fractions and not in material composites in the mixture of material supplied. They are transported off by means of conveyor belts to containers prepared for the individual fractions of material, and transported off by means of the containers for sale.

In the pre-sorting means 1, the plastics are removed from the remaining mixture of material and transported by means of a conveyor belt to a high-pressure washing facility comprising a subsequent dryer. The high-pressure washing facility serves as an organic collector. In the high-pressure washing facility, hot steam or hot water is preferably used as the washing fluid.

The washing fluid from the high-pressure washing facility, together with the organic refuse contained in it, is cleaned. The cleaned washing fluid is fed back to the high-pressure washing facility, i.e. moved in a closed circuit. The organic refuse collected during cleaning is supplied to a bio gas power station 2.

The purified plastics, still in a mixture of plastics, are taken once dried from the high-pressure washing facility to an analysing means 6 and examined for material degradation. Material degradation may in particular have taken place through the effect of sunlight while the plastics were being stored. The material degradation to be analysed is a destruction of the molecular structure or at least a shortening of the chain of molecules of the plastics. Degradation may have progressed so far that recycling is no longer worthwhile.

The analysis for material degradation is carried out by means of a testing method. In the example embodiment, a test is carried out on the tensile strength of the plastics. The tensile strength is thus the measure of the degradation. If the material falls short of a predetermined minimum tensile strength value when tested, this means that a predetermined, still admissible degree of degradation has been exceeded. In carrying out the test for tensile strength, individual lines, pieces and the like of plastic are taken from the mixture of plastics, each separately melted and separately pressed through a nozzle. In this way, a plurality of strips of for example 2 mm diameter are formed, which are then tested for tensile strength and for whether they fall short of the predetermined minimum tensile strength value.

The mixture of plastics is analysed in batches. For the analysis, random samples are taken from each batch of the mixture of plastics. The batches are sufficiently homogenous with respect to material degradation that the degree of degradation of a whole batch can be concluded from a few random samples. The homogeneity with respect to material degradation arises naturally, since the plastic refuse is not supplied to the recycling plant completely randomly. The refuse is already supplied in batches, for example in the form of a batch from each of: disposal site digging; industrial refuse; and household refuse. For the method in accordance with the invention, such batches can in general be regarded as homogenous with respect to the material degradation of the plastics contained in them. Significant degradation arises primarily due to storage at the site of the recycling plant.

The analysing means 6 can be an integrated component of the recycling plant and thus directly present at the site of the recycling plant. The analysing means 6 can, however, also be formed in an already existing material lab, away from the site of the recycling plant. In this case, the samples of material taken are forwarded to the material lab. The corresponding batch of the mixture of plastics is put into interim storage until the results of the analysis are available. Back on site, a decision can then be taken on further treatment of the respective batch by way of the results of the analysis. The results of the analysis can, however, also be converted into control signals and communicated to the plant by way of remote data transmission, for example directly from the material lab.

Figure 1:
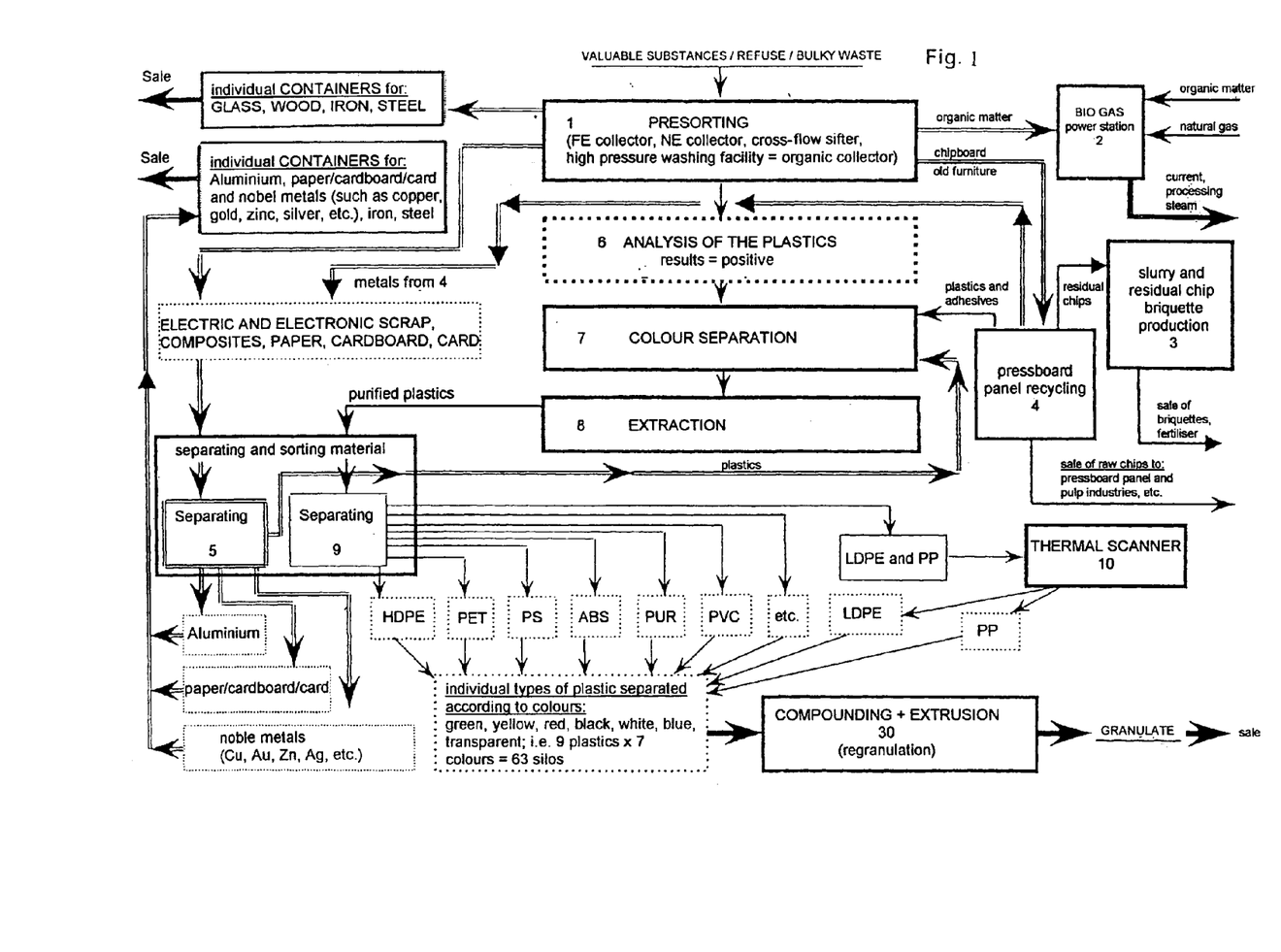
FIG. 1 a recycling plant comprising plant components for sorting and separating plastics according to colours.
Figure 2:
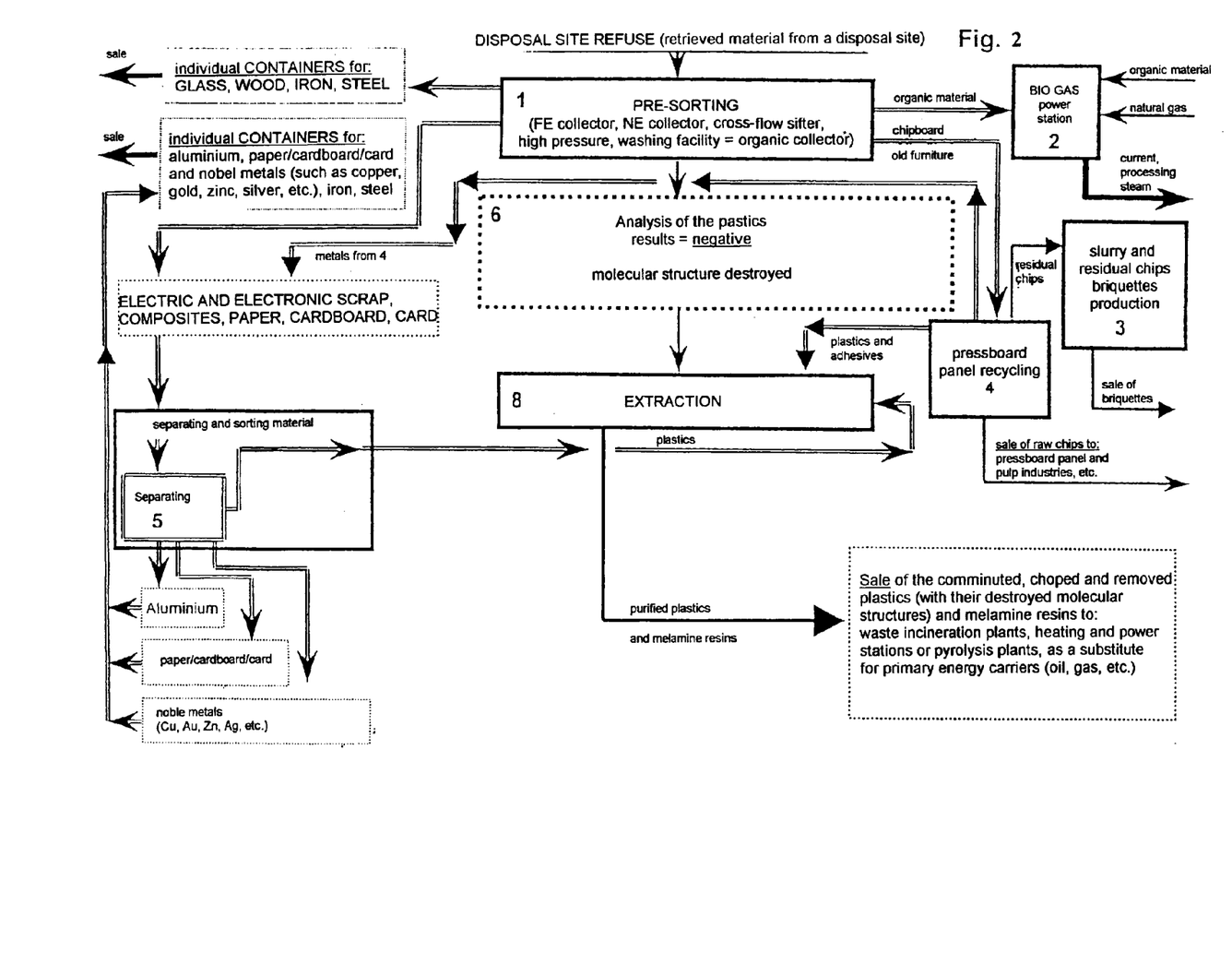
FIG. 2 the recycling plant in FIG. 1, for removed plastics.
Figure 4:
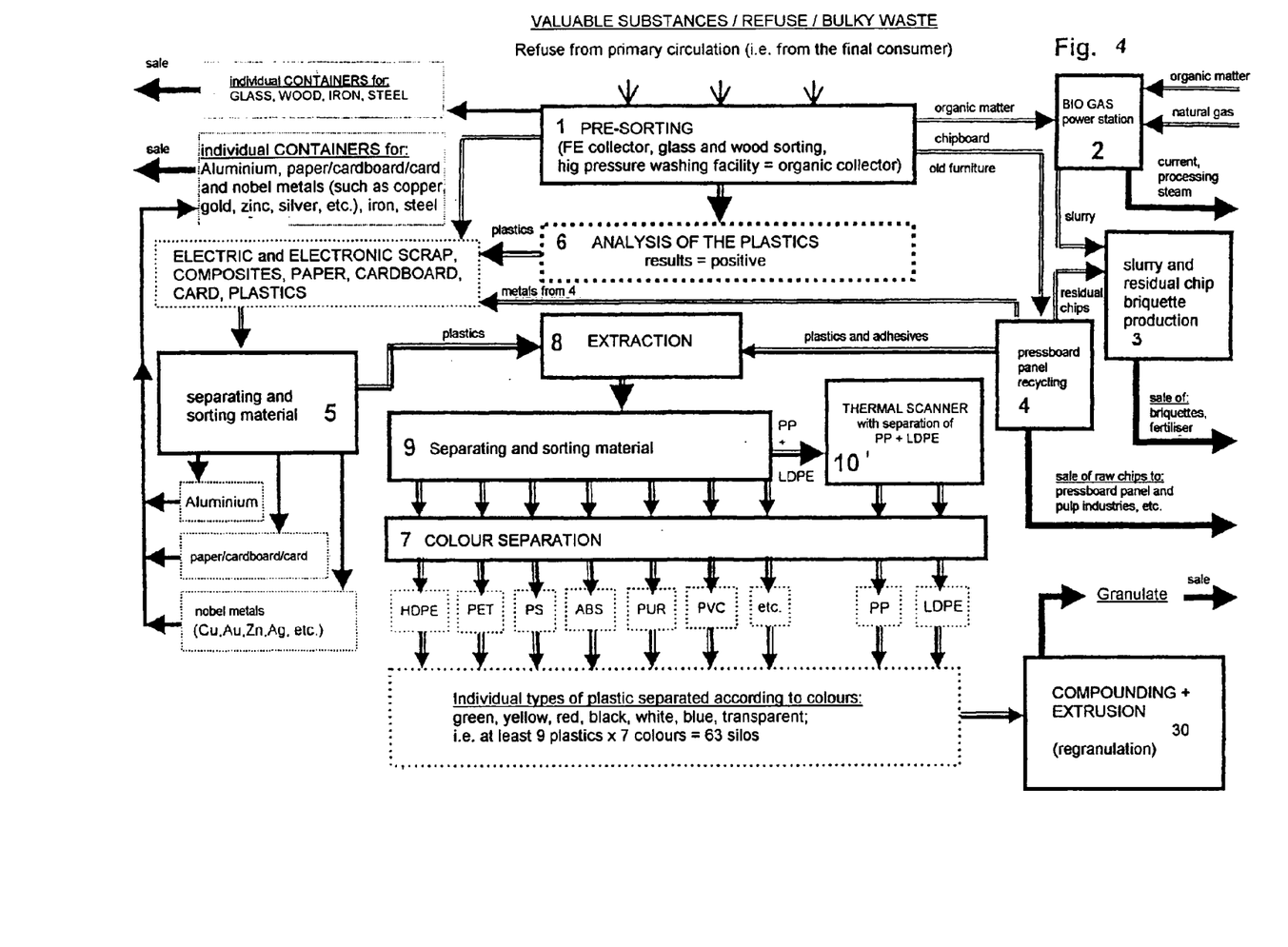
FIG. 4 a modified recycling plant comprising plant components for modified sorting and separating of plastics.
Figure 6:
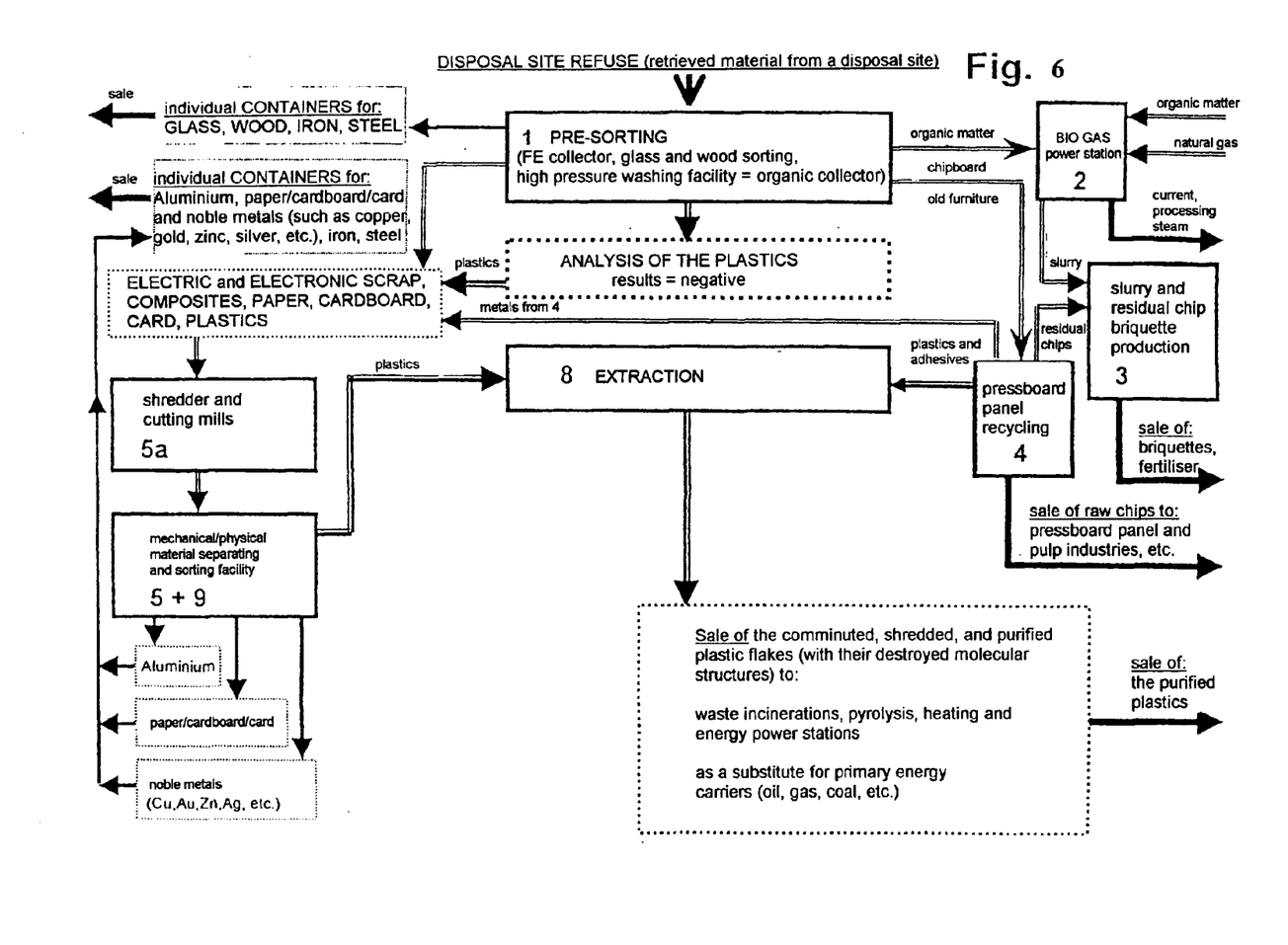
FIG. 6 the recycling plant in FIG. 4, for removed plastics.

FIGS. 1 and 4 show further treatment for those mixtures of plastics whose quality is sufficiently high with respect to material degradation for subsequent recycling. By contrast, FIGS. 2 and 6 show further treatment for mixtures of plastics whose results of analysis are that recycling would not be economically worthwhile, since material degradation is already too far progressed. By way of the results of analysis, the mixture of plastics is thus separated into two flows of material, namely into the flow of material to be sorted and separated according to colours and types (FIGS. 1 and 4) and the plastics to be removed (FIGS. 2 and 6).

In FIG. 1, the plastics are transported after analysis, still in a mixture of plastics, to a colour separating means 7. In the colour separating means 7, the plastics are placed on a sorting belt and sorted by hand according to the following seven primary colours of the primary colour system, i.e. RAL tones: green, yellow, red, black, white, blue and transparent. Toned colours are respectively assigned to the nearest primary hue, for example light green to RAL green and purple to RAL red. The plastics are separated in the colour sorting and separating means 7 according to primary colour fractions.

The primary colour fractions are given over to a comminuting means fraction by fraction. The comminuting means is formed by a cutting mill comprising cooled cutting tools.

The plastics in their primary colour fractions are comminuted, in particular shredded, in the comminuting means down to a particle size in the range 5 to 20 mm, then supplied to an extraction means 8. A plurality of extraction means, one per primary colour, may also be provided. In the extraction means 8, each primary colour fraction—separate from the other primary colour fractions—is rid of content material, for example migrated food such as lactic acids and flavourings, manufacturing additives such as silicic acid, stabilisers, colour compounds, as well as printing inks and adhesive contaminants, by surface purification and extraction, and then dried by means of being heated by hot steam. In this way the extraction medium is vaporised and transports the extracted material to an extraction medium purification means. Here, the extraction medium is condensed after each operating cycle, wherein the extracted material is precipitated out and the thus purified extraction medium can be used again. The extraction medium is moved in a closed circuit.

The printing inks precipitated out during condensation are separated and, in order to recycle them, sold to the printing inks industry.

In the example embodiment, the extraction means 8 is formed by a carrousel extractor. A carrousel extractor may for example used, such as built by Krupp Extraktions GmbH, Hamburg for the production of edible oils and spices. In this known carrousel extractor, hot water is used as the medium to extract ethereal oils which are unsuitable for human consumption from oil seeds and spices. As an extraction means, such an extractor can for example handle a batch of approximately 150 t of material for extraction, at an extraction capacity of 25,000 tonnes per year.

When extraction-treating the individual, pure in primary colour, fractions of plastics, however, not water but rather ethyl acetate is used. By using ethyl acetate, all contaminants and adhesions worked in by the manufacturer and processors during the manufacture and processing of the plastics are extracted, as well as subsequent contaminants arising from the use of the product.

The extraction means comprises a housing in the form of a drum made of special steel in which a star feeder, likewise made of special steel, is rotationally driven about its vertical rotational axis. The star feeder forms evenly distributed chambers or segments, for example twelve segments, over the circumference of the drum. The plastic granulate is filled from an introducing position above the drum, into the segment of the star feeder respectively situated under the introducing position. A spraying means is arranged behind this filling station, in the direction of rotation, by means of which ethyl acetate is sprayed into a segment containing plastic granulate.

When being sprayed in, the ethyl acetate exhibits a temperature in the range 30 to 60° C. and is thus warmer than the granulate which is introduced at ambient temperature. The increased temperature of the ethyl acetate prevents it from condensing on the surface of the granulate and then ineffectively dripping off. A heating means is present on site at the plant, for heating the ethyl acetate.

A station for draining the ethyl acetate, a station for introducing hot steam and lastly a station for unloading the batches of granulate from the segments in the drum are also present, distributed over the circumference of the drum. After the reaction time required for thorough extraction, the ethyl acetate is drained down through an opening in the bottom of the drum, collected and vaporised. The ethyl acetate vapour, rid of the dissolved contaminants, is collected again and fed back to a storage tank, to be re-used. A batch of granulate can also be sprayed many times in sequence with warm ethyl acetate which has been drained and guided back to be re-used after each new spraying in the manner described.

Once extraction is complete, the granulate still situated in the drum is purified at the hot steam station by means of hot steam. For this purpose, hot steam is introduced from beneath into the respective batch of granulate to be purified. The hot steam rises upwards in the segment of the star feeder, taking the still adhesive ethyl acetate with it. This simultaneously dries the granulate.

Lastly, the purified granulate is removed at the unloading station, to then be subject to separation according to type of plastic.

The non-rotating drum comprises a cylindrical surface area as well as a cover area and a base area. Inside the drum, the star feeder rotates, together with its radial segments. The star feeder rotates between the non-rotating base area and the non-rotating cover area of the drum. In the area of each station, either the cover area or the base area comprises openings in accordance with the purpose of the respective station, for example a triangular cutting in the cover area for introducing the granulate, and outlet slits or an outlet perforation in the base area for draining the extraction medium.

Obtaining pure-colour plastics in the two stages of (a) sorting and separating according to primary colours, and (b) subsequent extraction for each of the fractions of plastics, pure in primary colour, thus formed individually, has the advantage that fractions of pieces of plastics are obtained in the first step which arise from plastic granulates which are coloured in large quantities after refinery, according to primary colours, in particular RAL primary colours. This colouring according to primary colours is achieved by embedding the appropriate colour monomers in the polymer chains of the plastics. These colour monomers cannot be dissolved back out of the polymer chains without damaging or destroying the chains, not even by extraction. Smaller quantities of plastics can, by contrast, be colour toned by partially or completely imprinting or lacquering the surface of the plastics, or by adding colour compounds as additives, for example by extrusion. Additionally, there are other additives for setting other material characteristics. The fractions of plastics obtained following sorting and separating according to primary colours thus consist of a base material, namely the plastics which are pure in primary colour, which can always be treated the same in successive processing steps. In this sense, the material in each of the fractions of plastics which are pure in primary colour is the same. In subsequent extraction in the extracting means 8, additives and/or compounds are extracted, which were introduced during the manufacture of the plastic products to be recycled, before they were moulded so as to manufacture, for example, plastics for flat films, injection moulding, deep-drawing, and other plastics. In this way, for example, flow improvers are previously added to plastics which have been processed in an injection moulding method. These flow improvers, however, would hamper the production of flat films, for example the production of bi-axially orientated films in a Tenter method, and/or lead to holes in the film. Thus, in order to be able after recycling to manufacture a plastic for flat films from a plastic for injection moulding, the flow improvers are removed by means of extraction, in the extracting means 8. The recycled material thus obtained can be prepared again for the manufacture of, for example, plastics for flat films, once it has subsequently been separated according to type of plastic, for example by compounding in silicic acid as a spreader, to prevent static conglutination of the coiled up sheets of film.

After extraction, the purified, pure-colour fractions of plastics are fed one after the other, i.e. each colour individually, in a subsequent operating cycle to a mechanical/physical separating means 9 and separated according to individual types of plastics, in particular PET, PVC, PS, LDPE/PP, HDPE, PUR and ABS.

The fractions of material still left over after the plastics have been removed—electric and electronic scrap, material composites, paper, cardboard, card and aluminium—are fed by the pre-sorting and separating means 1 to another separating means 5, where they are separated from each other. The separating means 5 also receives material removed in a chip and fibre recycling means 4, in particular metallic materials, for example fittings. Plastics ending up in the separating means 5 are given over to the colour separating means 7.

The separating means 5 and 9 are each formed by a mechanical/physical separating means of the type known, for example, from EP 0 751 831 B1. In this device, material composites such as for example crisp packets are resolved by a rotating tool into their base materials, e.g. aluminium, low density polyethyls and polyester, and separated purely into types. Nonmagnetic metals, magnetic metals, cardboard, paper, card and noble metals are likewise separated purely into types and transported off in prepared containers, for sale.

In the example embodiment, the separating means 9 for plastics is spatially combined with the other separating means 5, but works separately of it, i.e. there is no transport of material between the two separating means 5 and 9. Preferably, the separating means 5 and 9 are one and the same means, being adapted to its respective separating task by modification and/or by altering settable method parameters. Using a separating means in accordance with EP 0 751 831 B1, the rotating tool in particular may be exchanged for this purpose. The method parameters for such a separating means are also optimally set according to the respective separating task, for example the speed of rotation of the tool. The separating means 5 and 9 are in a position to separate the various plastic, metal or plastic/metal fractions purely from each other according to type.

Plastic material which after separation end up in the separating means 5, for example material made of metal/plastic composites from crisp packets and the like, is given over to the colour separating means 7.

Plastics ending up in the separating means 9 which cannot be mechanically/physically separated from each other are transported from the separating means 9 by means of conveyor belt to a thermal scanner 10, and there thermally separated from each other. Such thermal separating is, to quote an example, preferably carried out on a mixture of LDPE and PP, which cannot be separated by the separating means 9 because of their virtually identical specific weights.

The thermal scanner 10 comprises a plurality of identical, individual thermal scanners, namely one for each of the primary colours. Thus, in the example embodiment, the thermal scanner 10 is formed by 7 individual thermal scanners which are preferably arranged next to each other in parallel. New colour blends are avoided.

Each of the individual thermal scanners work according to the principle of the hot air shrinkage tunnel, and includes a chamber and/or tunnel in which a continuous conveying means is installed. Each of the tunnels is charged with hot air which has a temperature, in particular in the tunnel, at least as high as the melting temperature of the lower melting plastic but lower than that of the higher melting plastic. The mixture lying on the conveying means of at least two plastics having different melting temperatures is thermally separated in this way, by setting the temperature of the atmosphere in the tunnel. The lower melting plastic, LDPE in the example embodiment, is raised by means of the hot medium to a temperature at which it passes from the solid to a liquid state of aggregation. The other, comparatively higher melting plastic remains in a solid state of aggregation at the selected temperature.

The hot gas in the thermal scanner 10 is preferably hot air. The energy for heating said medium is formed within the recycling plant itself, namely by means of the bio gas power station 2, as will be described below.

The thermal scanner 10 is advantageously formed by a re-constructed shrinkage tunnel, as used for shrinking packages, for example, by means of shrink film. The use of such an appropriately re-constructed shrinkage tunnel for thermally separating plastics in general, though preferably plastic refuse, also represents a subject of the invention.

Figure 3:
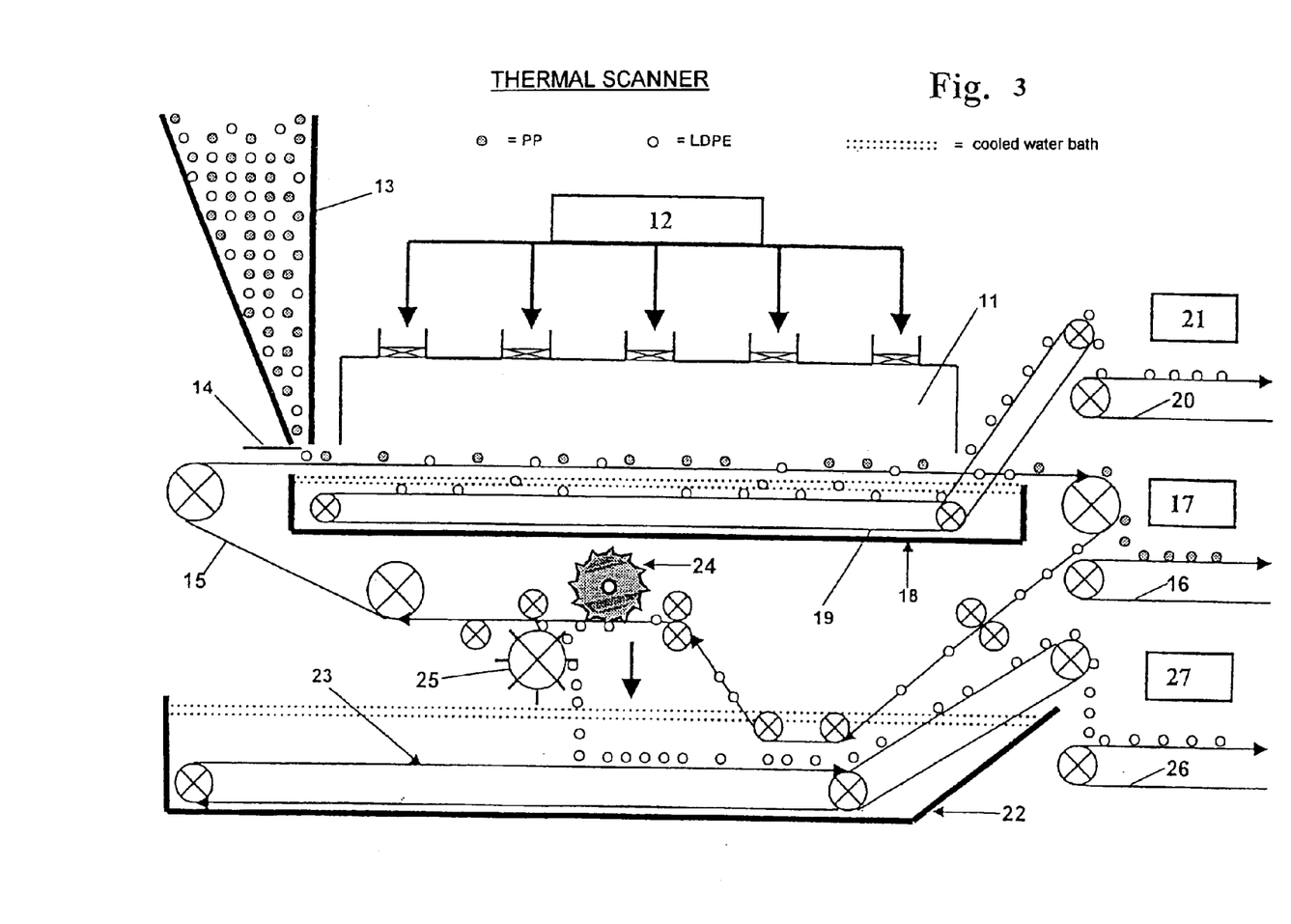
FIG. 3 a thermal scanner in a first embodiment.

FIG. 3 shows such a thermal scanner 10, formed by reconstruction from a conventional shrinkage tunnel. A single tunnel 11 of the plurality of tunnels in the thermal scanner 10 is representatively shown in this respect. The tunnel 11 is heated by a hot air ventilator 12.

A primary colour fraction of the purified, pure-colour fractions of plastics, consisting of LDPE and PP, is supplied on the conveying means 15 of the hot air tunnel 11 via a granulate silo 13 by means of a dosing means 14. The conveying means 15 is a continuous conveyor belt formed by steel members connected to each other. The steel members are Teflon-coated meshes. The mesh pattern is selected such that the LDPE and PP granulate, preferably LDPE and PP sieving grain, remains lying on the conveying means 15 when it is fed into the hot air tunnel 11, and does not fall through the mesh. The conveying means 15 guides the mixture of LDPE and PP through the hot air tunnel 11, which is kept at a temperature between the melting point of LDPE and that of PP. The temperature is preferably prepared according to the table by "Hans-Jürgen Saechtling, Kunststoff-Taschenbuch, Hansa Verlag 1986, München und Wien" [Hans-Jürgen Saechtling, paperback on plastics, Hansa publishing house 1986, Munich and Vienna]. Before being fed into the hot air tunnel 11, the LDPE and PP particles are taken from the granulate silo 13 onto the conveying means 15. The conveying means runs through the entire hot air tunnel 11. Once they have been run through the hot air tunnel 11, the PP particles lying on the conveying means 15, which have retained their original form due to their higher melting point, are dropped from the conveying means 15 onto a delivery means 16 arranged below. The delivery means 16 is preferably also a continuously circulating conveyor belt. A cold air shower 17 is installed above the delivery means 16 which returns the PP to room temperature and dries it. The PP particles are then taken to a conveying skip for further processing.

The LDPE melts at the prevailing temperature in the hot air tunnel 11 and falls or flows through the conveying means 15 into a cooling means 18, lying below and opening upwards. The cooling means 18 is preferably developed as a cooling bath; in the example embodiment, it is a cooled water bath. Shock cooling takes place in the cooling means 18, wherein the LDPE passes back from the flowing to the solid state of aggregation. In the cooling means 18, another conveying means 19, preferably in the form of a close meshed conveyor belt, is arranged running parallel beneath the conveying means 15. The re-solidified LDPE falls onto this conveying means 19 and is taken, lying on it, through the cooling means 18, i.e. out of the cooling bath, onto a delivery means 20, preferably also in the form of a conveyor belt. The delivery means 20 conveys the LDPE through under another cold air shower 21, by means of which it is dried using air at about 20° C. It is then taken, pure in type, to a conveying skip of its own for further processing.

Another part of the LDPE, namely the part which still adheres to the conveying means 15 after melting, is conveyed to another cooling means 22. The cooling means 22 is also preferably formed by a cooling bath, particularly preferably a cooled water bath. The cooling means 22 is preferably arranged underneath the conveying means 15 and preferably underneath the cooling means 18. A conveying means 23 is arranged in the cooling means 22 and/or in the preferred cooling bath, said conveying means 23 also preferably being developed as a close meshed conveyor belt. The melted LDPE still adhering to the conveying means 15 is likewise shock cooled as it is conveyed through the cooling means 22 and thereby passes into the solid state of aggregation. The thus solidified LDPE particles banging on the conveying means 15 are squeezed out of the conveying means 15 by means of an ejector 24, preferably a spiked roller. To this end, the ejector 24 is worked to fit exactly onto the pattern of the conveying means 15. A wiper 25, arranged behind the ejector 24 in the conveying direction of the conveying means 15, sweeps the LDPE off the conveyor belt 15. The wiper 25 is preferably formed by a rotating steel brush, working counter to the conveying direction of the conveyor belt 15. The swept off LDPE simply falls onto the conveying means 23 due to gravity. The conveying means 23 conveys the LDPE to a third delivery means 26 which in the example embodiment is likewise in developed as a delivery belt. The delivery means 26 carries the LDPE through under a third cold air shower 27, where it is dried by means of air of about 20° C. This part of the LDPE is then likewise taken, pure in type, to a conveying skip for further processing. This can be the same conveying skip as for the LDPE which was re-solidified in the cooling means 18.

The cold air showers 17, 21 and 27 may be separate units, or also a combined unit driven by means of a single ventilator.

A plurality of thermal scanners may also be arranged in sequence like a cascade, if more than two types of plastic are to be thermally separated from one another.

The fractions of plastic which then leave the separating means 9 and the thermal scanner 10 pure in type and colour are transported to silos, which are preferably also built on site at the recycling plant, and are put into interim storage there in their individual colours and types, until they are processed further. When further processed, or as in the example embodiment in a compounding and extrusion means 30 on site at the recycling plant, the fractions of plastic can be compounded according to the wishes of the customer, for example coloured according to a DIN standard and equipped for a new purpose using additives and then extruded. To this end, fractions of plastic, pure in type and colour, are melted and the respective compounds introduced, then extruded and regranulated. The reclaimed regranulate, pure in type and colour, is transported off to be sold.

Using the invention it is thus possible, for example, to manufacture a plastic for flat film from plastic for injection moulding.

FIG. 2 shows the further treatment of the flow of plastic material removed on the basis of the results of the analysis of the plastic. This can above all be the case when the input is disposal site refuse. The removed batch is first comminuted into plastic particles of a size between 5 and 20 mm. Fir this purpose, the already described comminuting means is used, which is also used for batches subjected to the described colour separating.

The removed batch of plastic with the comminuted plastic particles is given over to the extraction means 8 and treated there in the same manner as described above re primary colour fractions.

After extraction, the granulate of the thus purified plastic particles is taken to storage containers, or delivered directly to incineration plants for use as fuel.

The recycling plant in the example embodiment comprises all the components described, at a single plant site. Dislocation of components is, however, possible. In particular, it can be flexibly adapted to local conditions, for example the ground or limited installation areas.

As a further fraction of material, pressboard material and old furniture are removed in the presorting and separating means 1 and fed as a fraction of their own to a chip and fibre recycling means 4. The recycling means 4 works according to a multi-stage thermo-mechanical method, for example according to the method described in DE 195 09 152 A1. Using this means, reprocessible wood chips and pulp fibres are obtained from old furniture and pressboard material, in particular pressboard panels, as well as other production residue and spoilage from the wood-processing industry. At the end of the chemico-thermo-mechanical method, the wood chips and fibres obtained here are loaded into containers and delivered to the chipboard and/or the pulp industry. The yield of chips and fibres stands at over 95%.

The remaining chips and fibres which are not recyclable are given over in slurry to a briquette producing means 3 positioned afterwards and there pressed into slurry briquettes. The slurry from the earlier recycling means 4 is thus pressed into briquettes, and subsequently dried. Because the content of e.g. paper fibres and residual wood chips from the recycling means 4 is still high, the briquettes can be used as a substitute for coal briquettes or wood for firing in grate ovens. To this end, the slurry briquettes are packed up as stock into packages of about 10 kg each and transported off to be sold.

Using the ALL INPUT recycling described above, waste management can be realised, for instance in Germany, with only two waste containers per household: a biological waste bin, which for reasons of hygiene is retained, whereby the biological waste may be packed in plastic bags, and a bin for other waste, for all other household refuse. From the point of view of the recycling technology in accordance with the invention, however, it is also possible to collect all household refuse in a single bin. Due to the simple handling for the final consumer, the ALL INPUT recycling technology is also particularly suitable for use in countries in which costly pre-sorting by the final consumer cannot be realised.

Lastly, the bio gas power station 2 already mentioned is integrated into the recycling means. The bio gas power station comprises a bio gas generator, which the organic refuse from the pre-sorting and separating means 1 is fed to. The biomass is converted in the bio gas generator into methane gas by micro-organisms. The methane gas generated is compressed in a compressor station and then, according to the quantity of gas accumulated and depending on the flow rate of the bio gas generator, is fed to one or a plurality of small gas turbines in the bio gas power station 2. A generator is coupled to each of the gas turbines, for generating current. The advantages of small gas turbines as compared to gas motors, which may also be used as a substitute, are the substantially higher energy yield, longer life span, greater reliability and stability of the gas turbine.

Optionally, instead of or in addition to methane gas, natural gas can be fed to the gas turbine(s) and combusted in it/them. For this purpose, the natural gas is stored up in a storage tank of the plant and can be supplied at any time. Through the arrangement of a plurality of turbines and/or the supply of natural gas, each gas turbine can be driven at optimal capacity at any time.

The possibility also exists of using organic refuse from outside the plant in the bio gas power station. This organic matter from outside the plant may for example come from surrounding agriculture or from the households of the surroundings municipalities. It can be given over to the bio gas generator 2. In this respect, a further bio gas generator of its own may also be provided, for generating methane. The methane gas generated in this way can also be combusted in the gas turbines.

The exhaust gas from the gas turbine(s), produced by the combustion of methane gas, natural gas or a mixture of the two gases, is used for producing high pressure steam in a steam boiler. The high pressure steam is fed to a steam turbine topped by a generator, such that the energy in the exhaust gas of combustion is utilised once more. The steam coming out of the steam turbine is used as processing energy for the chip and fibre recycling means 4, the briquette producing means 3, the extraction means 8 and the thermal scanner 10. The processing energy can be fed back into steam production or fed into a long-distance energy network.

FIG. 4 shows a modified recycling plant in which extraction is carried out before colour separation. The fractions of plastics in this plant are also sorted and separated according to type of plastic before colour separation. In an alternative embodiment, the modified plant further comprises a thermal scanner 10' directly topped by opto-electronic type-separation. The other components of the plant correspond in their design and function to those of the recycling plant according to FIG. 1. In the following, therefore, only the deviations of the modified recycling plant from the plant already described will be explained.

Having passed through the analysing means 6, the plastics found to be worth recycling, together with the other recyclable material from the pre-sorting and separating means 1 and possibly the plastics from the chip and fibre recycling means 4, are given over to the mechanical/physical separating means 5. In the mechanical/physical separating means 5, the plastics are separated from the other material, and are then given over to the extractor 8 as a comminuted fraction of plastics. They may be comminuted before or after mechanical/physical separation. The extractor 8 corresponds to the extractor of the plant in FIG. 1. The plastic particles, which are ideally in their pure primary colours after extraction, are then separated according to types in the second type-separating means 9, which preferably corresponds to the mechanical/physical separating means 9 in FIG. 1. The plastics PP and LDPE, which can only be mechanically/physically separated from each other with difficulty or not at all, are given over to the thermal scanner 10' and separated by the thermal scanner 10'.

The plastic particles obtained in the second type-separating means 9 and 10', separated according to types, are fed to a fully automatic colour separating means 7' and separated and sorted according to primary colours. They are preferably colour separated opto-electronically, for example using a colour sorting device by the firm Mogensen GmbH & Co. KG, Wedel, Germany.

Figure 5:
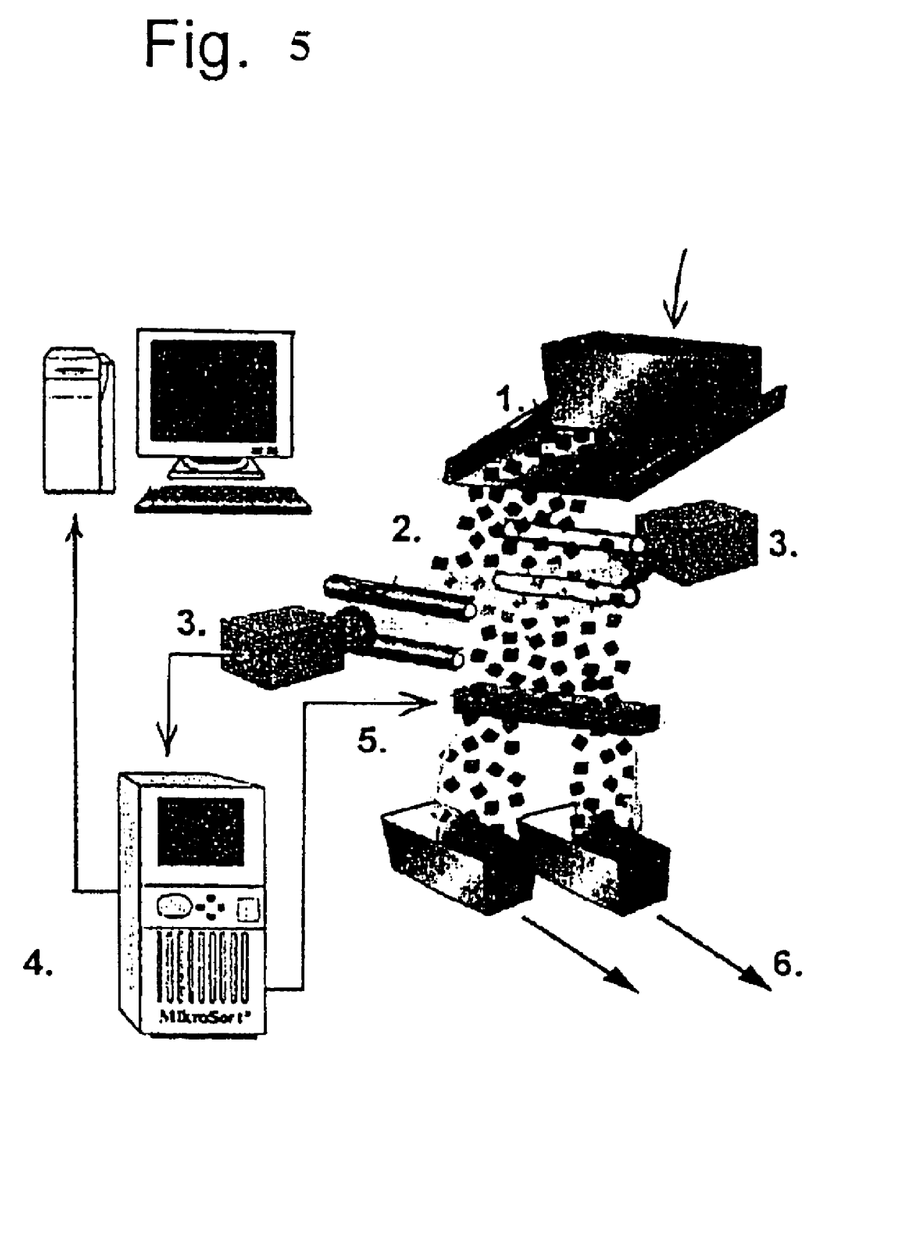
FIG. 5 fully automatic colour separation.

FIG. 5 shows a schematic representation of such a fully automatic colour separating means 7' separating a fraction of small plastic particles which are pure in type. In a first step, the plastic particles are scattered on an integrated swinging conveyor. In a second step, they are put into free fall by the swinging conveyor. This creates a "product curtain" which in a third step is scanned by a high resolution optical system, and the scan evaluated. In accordance with the results of the evaluation, each individual plastic particle is identified by colour. In an immediately subsequent fifth step, the plastic particles in the product curtain are selected by high-precision pulses of pressurised air, i.e. in accordance with their colour, the plastic particles are individually applied with a pulse of pressurised air of a particular strength, or only the particles of a single colour are applied at all and the colours are separated in a plurality of stages. As a result, the overall flow of the fraction of plastic particles which are pure in type is separated into one partial flow per colour. In the subsequent sixth step, the partial flows, pure in type and colour, are transported off.

FIG. 6 shows the flows of material in the plant according to FIG. 4, if plastics are removed. The procedure follows directly from FIG. 5 itself and corresponds to the procedure in the plant according to FIG. 2, except for feeding the plastics to mechanical/physical separation.

Figure 7:
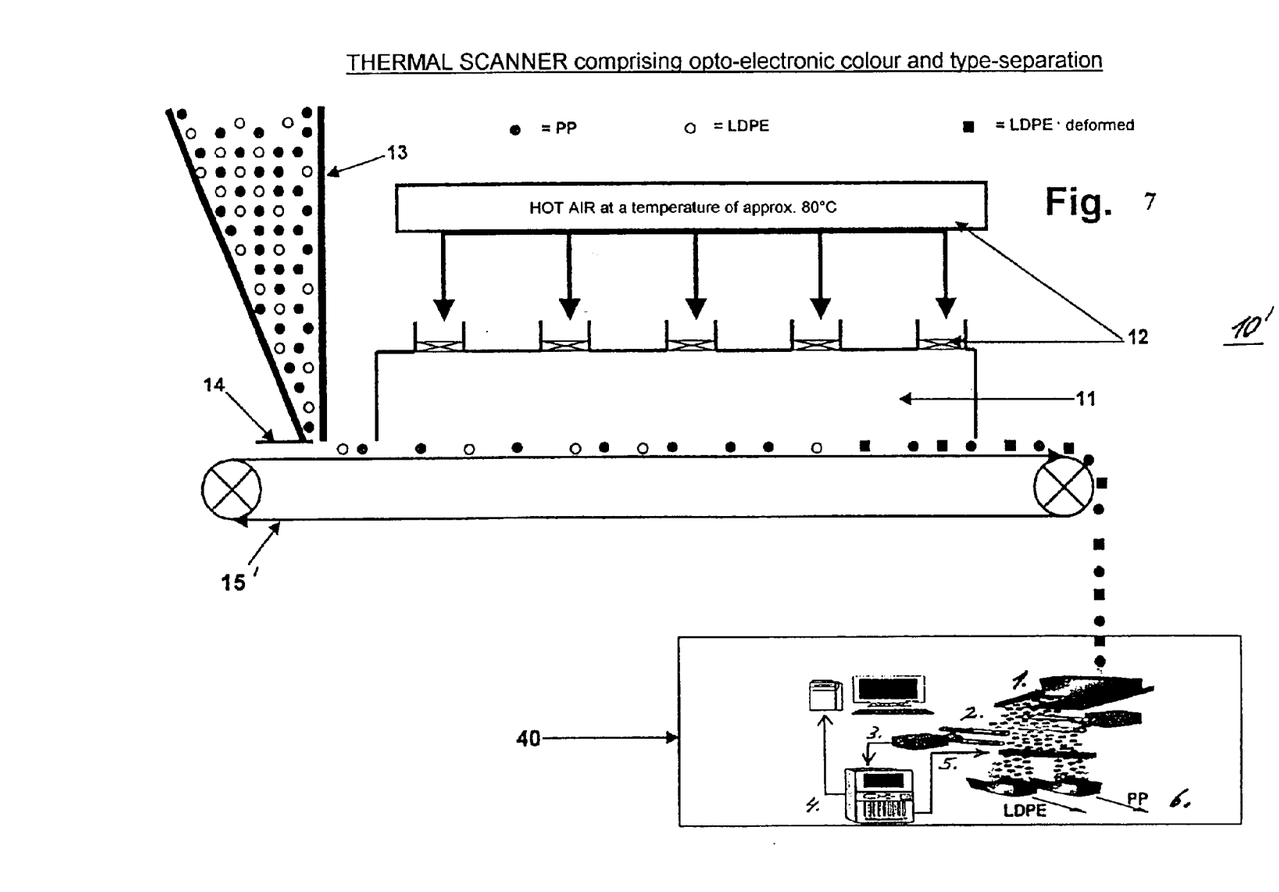
FIG. 7 a thermal scanner in a second embodiment.

FIG. 7 shows the thermal scanner 10' immediately topped by an opto-electronic type-separation in a type-separating means 40.

With respect to the supply of granulate, the tunnel 11 and the heating of the tunnel, the thermal scanner 10' corresponds to the thermal scanner 10 in FIG. 3. As opposed to the thermal scanner 10 in FIG. 3, a continuous conveying means 15' is used instead of a perforated conveying means, said conveying means 15' forming a closed support for the plastic particles lying on it. As in the example embodiment in FIG. 3, the conveying means 15' is preferably formed by a Teflon-coated or, for example, chromium-plated link conveyor. The conveying means 15' forms a support having a low-friction surface, so that the plastic particles lying on it cannot adhere. The plastic particles of the lower melting plastic are at least superficially melted in the thermal scanner 10'. According to their respective melting temperatures, the plastic particles leaving the conveying means 15' exhibit either a melted or non-melted surface, by way of which they are then identified in the type-separating means 40 and separated from the non-melted plastic particles. The plastic particle are transferred from the conveying means 15' to the type-separating means 40 by means of gravity, in that at the transport end of the conveying means 15' they simply fall into a receptacle of the type-separating means 40 arranged vertically underneath the conveying means 15'.

The type-separating means 40 corresponds to the colour separating means 7' in FIG. 5, with the one exception that the plastic particles are identified and separated from one another by their surface instead of by their colour. With respect to the procedure in the type-separating means 40, reference is therefore made to the description of automatic colour separation.

List of Reference Numerals 1 first type-separating means, pre-sorting and separating means
2 bio gas power station
3 press, briquette producing means
4 first type-separating means, chip and fibre recycling means
5a comminuting means
5 first type-separating means, mechanical/physical separating means
6 analysing means
7a colour separating means
7 colour separating means
8 extraction means, extractor
9 second type-separating means, mechanical/physical separating means
10 second type-separating means, thermal scanner
10' second type-separating means, thermal scanner
11 tunnel
12 hot air ventilator
13 granulate silo
14 dosing means
15 conveying means
15' conveying means
16 delivery means
17 cold air shower
18 cooling means, cooling bath
19 conveying means
20 delivery means
21 cold air shower
22 cooling means, cooling bath
23 conveying means
24 ejector, spiked roller
25 wiper, steel brush
26 delivery means
27 cold air shower
28–
29–
30 compounding and extrusion means
40 optical type-separating means.

What is claimed is:

1. A sorting and separating method for recycling plastics which are provided in a mixture of plastics as refuse, comprising the steps of:
    separating and sorting the mixture of plastics according to colour into fractions separated according to colour; and
    separating and sorting the fractions of plastics thus obtained according to types of plastic.

2. The method of claim 1, wherein the mixture of plastics is sorted and separated according to primary colours.

3. The method of claim 2, wherein the primary colours are standardized colours.

4. The method of claim 3, wherein the primary colours are RAL primary colours.

5. The method of claim 1, wherein the fractions of plastics, separated according to colours, are subjected to extraction in an extractor having an extraction medium, wherein the extraction medium is ethyl acetate.

6. The method of claim 5, wherein the extractor is a carrousel extractor.

7. The method of claim 1 further comprising before the step of separating and sorting the mixture of plastics by colour, the step of analyzing the mixture of plastics for material degradation, wherein the plastics contained in the mixture of plastics are sorted and separated according to colour if the analysis establishes that a predetermined degree of degradation has not been exceeded.

8. The method of claim 1, wherein plastics with different melting temperatures, which are obtained as a mixture by means of or after the step of separation according to colours, are separated thermally by means of a thermal scanner.

9. The method of claim 8, wherein the thermal scanner includes a conveying means comprising a perforated support on which the plastics, to be thermally separated, are transported and heated to a temperature at which at least one of the plastics is in a free-flowing and at least one other of the plastics is in a solid state of aggregation.

10. The method of claim 9, further comprising the step of collecting the plastic which has been transferred by heat to a free-flowing state of aggregation in a cooling bath to be re-solidified.

11. The method of claim 10, wherein the plastic which has been transferred to a free-flowing state of aggregation by heat is LDPE.

12. The method of claim 8, wherein the types of plastics are LDPE and PP.

13. The method of claim 1, further comprising the step of washing the mixture of plastics with a washing fluid;
    and thereafter, feeding the washing fluid—together with washed out organic material contained in it—to bio gas power station comprising a bio gas generator which generates methane gas from the washed out fluid and the organic material by means of micro-organisms, and a gas turbine to combust the methane gas, wherein energy produced from the combustion of the methane gas is used for separating and sorting the mixture of plastics.

14. A plant for recycling plastics contained in a mixture of refuse material containing plastics and non-plastics, said plant comprising:
   a) a first type-separating means with which plastics and non-plastics are separated;
   b) a second type-separating means adapted to receive the plastics from the first type-separating means with which the plastics are sorted and separated according to colours into fractions; and
   c) a third type-separating means adapted to receive the fractions of plastics from the second type-separating means with which the fractions are separated according to types of plastic.

15. The plant of claim 14, wherein the second type-separating means comprises a carrousel extractor in which the fractions of plastics, sorted according to colours, are individually subjected to extraction using a hot extraction medium.

16. The plant of claim 14, wherein the third type-separating means comprises a thermal scanner which comprises a conveying means with a perforated support for plastics in a hot gas tunnel.

17. The plant of claim 16, wherein the thermal scanner further comprises a cooling means arranged underneath the perforated support.

18. The plant of claim 14 further comprising a bio gas power station with a bio gas generator topped by at least one gas turbine, wherein
   the bio gas generator generates methane gas by means of micro-organisms from organic material removed from the refuse material, and wherein
   the methane gas is combusted in the gas turbine and
   used to produce processing energy and/or electrical energy for the plant.

19. The plant of claim 14 further comprising a chip and fibre recycling means with which re-processible chips and fibres are obtained in a multi-stage chemical-thermo-mechanical method from wood refuse separated out from the mixture of material in the plant.

20. The plant of claim 14, wherein
   the plastics are subjected to an analysis for material degradation by means of an analysing means, wherein the
   plastics are only sorted and separated according to colours if a material degradation of the plastics does not exceed a predetermined degree of degradation.

21. The plant of claim 20 wherein the plastics which do not exceed the predetermined degree of degradation are comminuted into plastic particles to be used as fuel.

* * * * *